UNITED STATES PATENT OFFICE.

JOHN McKELLAR, OF THOMASTON, MAINE.

IMPROVEMENT IN BEER-POWDERS.

Specification forming part of Letters Patent No. 28,289, dated May 15, 1860.

*To all whom it may concern:*

Be it known that I, JOHN McKELLAR, of Thomaston, in the county of Lincoln and State of Maine, have invented a new and useful Composition of Matter to be used in Manufacturing Beer; and I do hereby declare the same to be fully described in the following specification.

The constituents and proportions of the said beer-powder are as follows: one pound of hops, eight pounds of wheat-flour, one pound of powdered ginger, one pound of rasped or powdered lignum-vitæ, three-fourths of a pound of tartaric acid, and seven and one-half ounces of essence composed of one part of some essential oil—such as that of spruce, for instance—and four parts of common alcohol.

In making the said composition or beer-powder, the hops, with a sufficient quantity of water, should be put into a boiler or kettle, which should be heated until a very strong decoction is produced. After this the liquor should be separated from the hops and again boiled away to four and one-half pints, after which it may be suffered to cool. Next, three pounds of the flour should be mixed with it, and to the mixture should be added a little of the beer-powder, some yeast or other matter suitable to produce fermentation in the mixture. After such fermentation has been produced three pounds more of the flour should be stirred into the mixture and allowed to stand until a second fermentation takes place, after which the remaining two pounds of flour shuld be added to the mixture in order to convert it into dough, which subsequently should be spread or rolled out into thin sheets and dried. After desiccation has properly taken place the mixture should be ground to a powder and mixed with the tartaric acid. Finally, the lignum-vitæ, ginger, and essence should be commingled, and after the alcohol may have evaporated from them and the mixture become dry, this last combination should be thoroughly incorporated or mixed with the first, the whole constituting the composition or beer-powder, as above mentioned. In respect to the different ingredients thereof, their purposes or operation may be explained as follows: The flour, from having been fermented, serves to cause and promote fermentation during the manufacture of beer with the said composition. The tartaric acid renders the beer palatable and prevents it from becoming ropy or sticky, and, furthermore, the acid operates to quench thirst, while the essence gives to the beer the proper flavor. The hops, the lignum-vitæ, and the ginger impart richness and strength to it, and, besides, are advantageous in other respects.

Most persons are unacquainted with the usual processes of making beer, and, besides, these processes are more or less expensive and productive of loss, for reasons well understood. With my powder or composition either a small or a large amount of beer can be expeditiously manufactured, as occasion may require. Besides the said beer-powder is not likely to spoil in any climate or under any change of temperature, and therefore is very useful on shipboard, as well as on shore.

In using the said beer-powder in the manufacture of beer the following mode of proceeding may be adopted: Put one-half pint of molasses and nine ounces of sugar into a stone or earthen vessel and with hot water sufficient to dissolve the saccharine matter and stir the whole until the same is dissolved. Next add to the solution a sufficient quantity of water to make the whole equal to six quarts and bring the same to a temperature of about blood-heat, and add to the mixture two ounces of the beer-powder. Stir the whole a few minutes, and next allow it to stand in a warm place or room for twenty-four hours, or until fermentation takes place. The commencement of fermentation will be discovered by the small bubbles which will appear on the surface of the liquid. After the fermentation has been continued a suitable length of time the liquor should be drained carefully from the sediment and strained and bottled. In the course of twelve or twenty-four hours it will be fit for use. Should a thick scum appear on the surface of the beer it should be removed before separating the beer from the sediment.

I claim—

The said composition or beer-powder, made substantially as described.

JOHN McKELLAR.

Witnesses:
J. A. JONES,
C. H. HASKELL.